United States Patent [19]

Pyatov

[11] Patent Number: 4,932,479
[45] Date of Patent: Jun. 12, 1990

[54] VACUUM-COMPRESSION TYPE PERCUSSION POWER TOOL WITH A PUMPING CHAMBER

[76] Inventor: Vladimir Pyatov, 962 S. El Camino Real, #202, San Mateo, Calif. 94402

[21] Appl. No.: 190,341

[22] Filed: May 5, 1988

[51] Int. Cl.$^5$ ............................................. B23Q 5/00
[52] U.S. Cl. ..................................... 173/14; 173/116; 60/542
[58] Field of Search ..................... 173/14, 116; 60/542; 92/134

[56] References Cited

U.S. PATENT DOCUMENTS

| 3,161,242 | 12/1964 | Etzkorm et al. | 173/116 X |
| 3,559,751 | 2/1971 | Yamada | 173/116 |
| 4,690,225 | 9/1987 | Tupitsyn et al. | 173/116 |

FOREIGN PATENT DOCUMENTS

| 2253174 | 5/1974 | Fed. Rep. of Germany | 173/116 |
| 0988542 | 1/1983 | U.S.S.R. | 173/116 |

Primary Examiner—Douglas D. Watts
Assistant Examiner—James L. Wolfe

[57] ABSTRACT

A vacuum-compression type percussion power tool comprises a housing (12), a cylinder (14) fixed in the housing, a piston (16) reciprocating in the cylinder (14) from a reciprocating drive mechanism such as a crank mechanism (18) driven by an electric motor, or any other suitable drive, a working tool (24) installed in the front part of the power tool, and a floating striker (34) which slides inside cylinder (14) in a space between a tail portion (26) of working tool (24) and the lower end of the piston. The power tool has a sealed auxiliary chamber (54, 56), which is formed by a hollow casing (48) which surrounds the cylinder, and a space below striker (34). The auxiliary chamber is connected to a main working chamber (38), which is formed between the piston and the striker, through a set of compensation holes (44) and a set of idle-stroke holes (46). The power tool has a pumping chamber (27) which is formed in the upper part of cylinder (14) between the upper end face of piston (16) and a closed cover (17). The pumping chamber is sealed against penetration of air from the atmosphere and has a pair of check valves, one of which (45) admits air from the atmosphere into this chamber, and another one (47) admits air from the pumping chamber (27) into the auxiliary chamber (54, 56). In a second embodiment, the reciprocating drive mechanism (18) is located in the pumping chamber. Application of the pumping chamber provides an increased pressure of air within the auxiliary and main working chambers, so that the power tool operates with an increased energy of impact and reduced level of vibrations on the housing.

13 Claims, 2 Drawing Sheets

VACUUM-COMPRESSION TYPE PERCUSSION POWER TOOL WITH A PUMPING CHAMBER

BACKGROUND

1. Field of the Invention

The present invention relates to power tools, particularly to hand-held vacuum-compression type percussion tools used in the construction industry for demolition of old buildings, pavement breaking, etc.

2. Description of Prior Art

The major problem experienced by the manufacturers of hand-held impact and percussion power tools is to find a compromise among three contradictory requirements, i.e., to provide high energy of impact, light weight of the power tool, and reduced level of vibrations on the power tool's housing. These requirements are dictated by strict sanitary norms.

However, the three requirements mentioned are interrelated so that satisfaction of one of them results in impairment of the others. For example, an increase in the impact energy leads to an increase in weight and level of vibrations. Attempts have been made previously to solve these problems by developing new improved hand-held percussion power tools.

One vacuum compression type power tool aimed at the solution of the above problem is described in my copending U.S. patent application No. 07/187,554 filed Apr. 28, 1988. This vacuum-compression type percussion power tool comprises a housing, a cylinder fixed in the housing, a piston reciprocating in the cylinder from a reciprocating drive mechanism such as a crank mechanism driven, e.g., by an electric motor, a working tool installed in the front part of the power tool, and a floating striker which slides inside the cylinder in a space between a tail portion of the working tool and the lower end of the piston. In addition to a main working chamber, the power tool is provided with a sealed auxiliary chamber which is connected with the main chamber through compensation holes and idle-stroke holes.

A check valve is installed in the wall of the auxiliary chamber. This check valve, which connects the auxiliary chamber with an atmospheric-pressure space between the housing and the cylinder, allows flow of air in a direction only from the above-mentioned atmospheric-pressure space to the auxiliary chamber. As a result, during several cycles after starting the power tool, an additional quantity of air will be sucked into the auxiliary chamber via the valve, so that after reaching established conditions, the auxiliary chamber and the main chamber will operate with an increased amount of air, and therefore, with an increased pressure at the commencement of each cycle. This will increase the energy of impact.

Although the power tool described in my above-mentioned patent application provides an increased energy of impact and has a reduced level of vibrations transmitted to the housing, this construction is effective only for power tools with the impact energy below 80 Joules. In the case where more powerful tool is required, e.g., for breaking extremely hard rocks and concretes, the above-described power tools appears to be insufficiently powerful.

OBJECTS AND ADVANTAGES OF THE INVENTION

Accordingly, it is an object of the invention to provide a hand-held percussion type power tool (hereinafter referred to simply as a percussion power tool) which develops an increased energy of impact in combination with reduced weight and length. Other objects and advantages of the present invention will be understood after consideration of the drawings, ensuing description, and claims.

DRAWINGS

Figure 1:
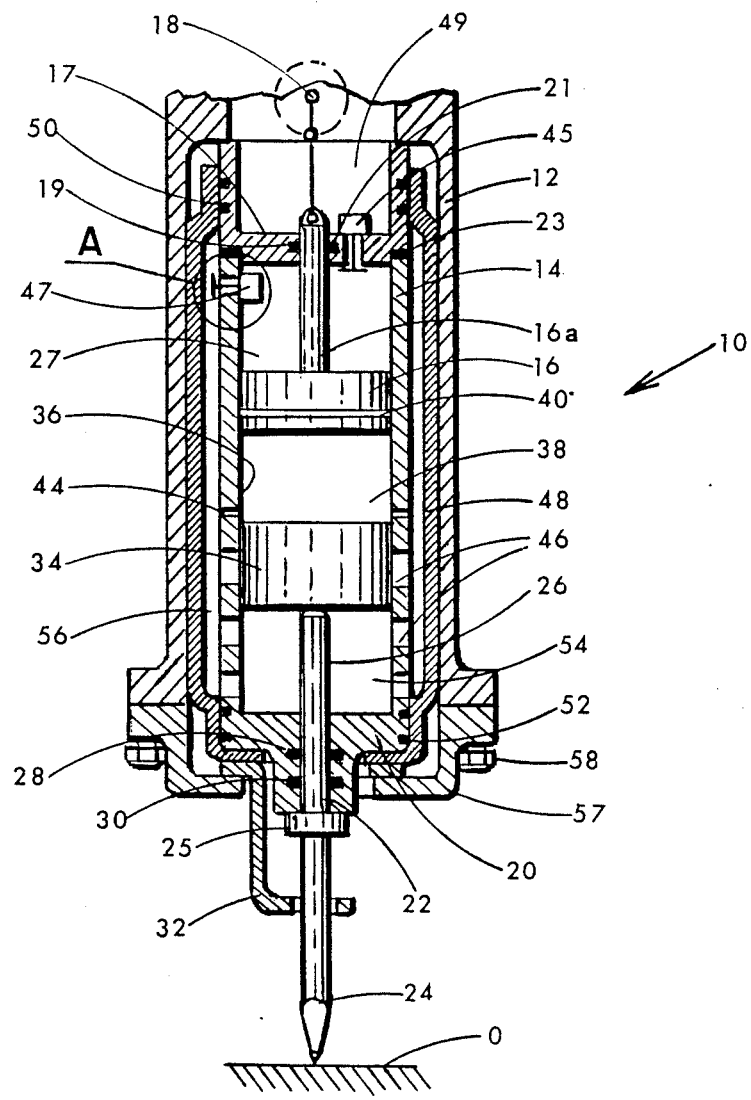
FIG. 1 is a schematic longitudinal sectional view of a percussion power tool of the invention.
Figures 2, 3:
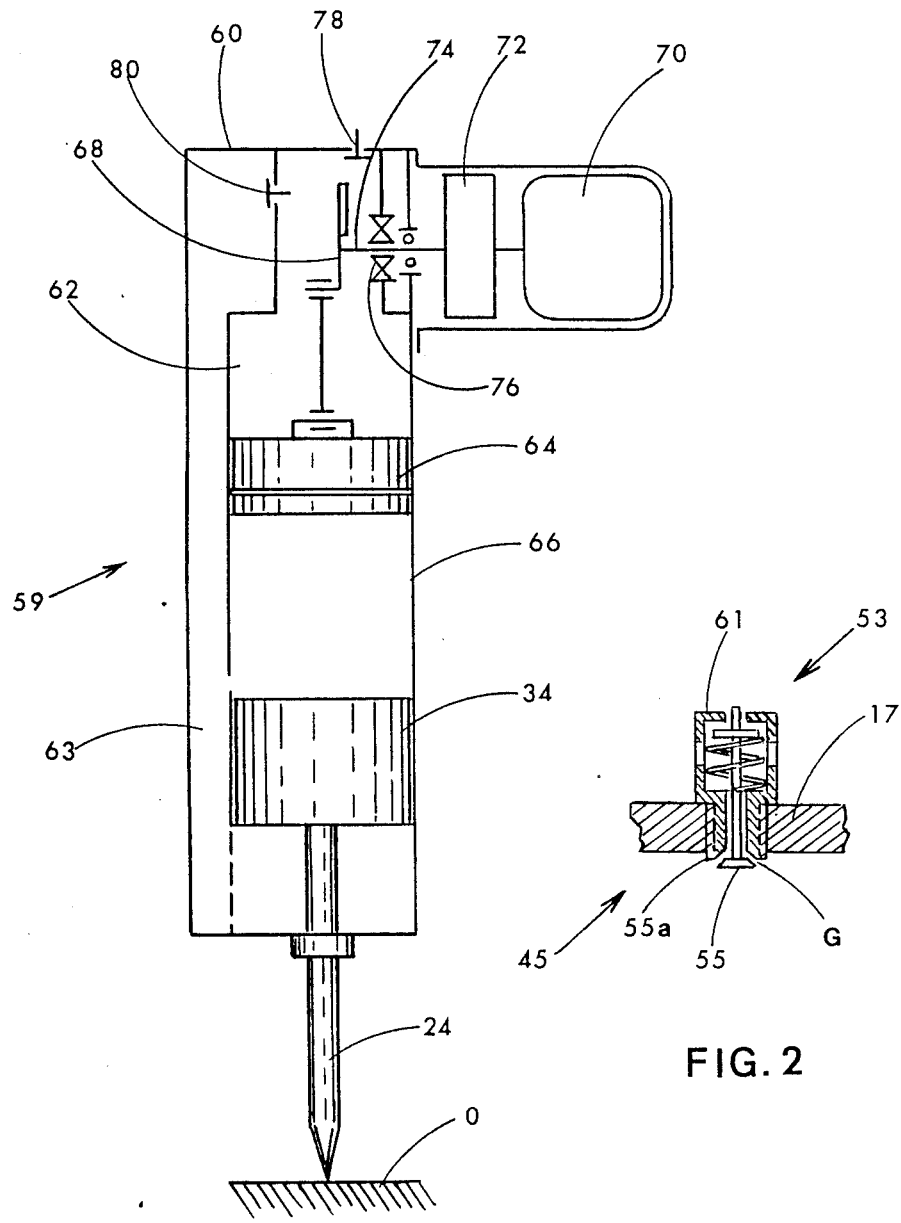
FIG. 2 is a sectional view of detail A of FIG. 1 shown on a larger scale.
FIG. 3 is a longitudinal schematic sectional view of a percussion power tool in accordance with the second embodiment of the invention.

FIGS. 1, 2 and 3—Description of a Percussion Power Tools of the Invention

A schematic longitudinal sectional view of a percussion power tool of the invention is shown in FIG. 1. The percussion tool, which in general is designated by reference numeral 10, is comprised of a housing 12 which supports a cylinder 14. Cylinder 14 contains a piston 16 with a piston rod 16a. Piston 16 reciprocates within the cylinder and is driven through a conversion mechanism, e.g., a crank mechanism 18, which is pivotally connected to the upper end of piston rod 16a and is located in the upper portion of housing 12. It should be understood that the conversion mechanism is shown as a crank mechanism only as an example, and that it can be any other suitable mechanism such as wobbling mechanism, cam mechanism, etc. The conversion mechanism, in turn, can be driven from an electric motor through a reducer (not shown).

Cylinder 12 has a closed bottom wall 20 with a central guide hole 22. A tail portion 26 of a working tool, such as a chisel 24, is inserted through hole 22 into cylinder 14. Chisel 24 has a flange 25 which restricts penetration of tail portion 24 into cylinder 14. Tail portion 26 of the working tool is sealed within hole 22 by seal rings 28 and 30. Working tool 24 is restrained from falling out from the power tool by a holder 32 which is attached to housing 12.

Located between piston 16 and tail portion 26 of the working tool is a striker 34 which is made in the form of a solid floating piston.

Piston 16, striker 34 and inner walls 36 of cylinder 14 define a main working chamber 38 of the power tool. The upper part of cylinder 14 above piston 16 is closed by cover 17 with a central opening 19. Piston rod 16a passes through opening 19 and is sealed against the walls of the opening by a seal ring 21. A seal ring 23 is placed between cover 17 and cylinder 14. As a result, a sealed pumping chamber 27 is formed between cover 17, inner walls 36 of cylinder 14 and upper face of piston 16. Piston 16 has a peripheral seal ring 40 which seals the periphery of piston 16 against inner wall 36 of cylinder 14 and prevents leakage of air between chambers 27 and 38 through the peripheral part of the piston.

In order to understand the subsequent description of the invention and particularly the location of various compensation ports, it is necessary to introduce the term "initial position" of the parts of the power tool. This initial position occurs when working tool 24 is pressed to an object 0 and therefore flange 25 is urged to the outer surface of bottom wall 20 of the cylinder. In FIG. 1 all the parts are shown in the initial position.

Cylinder 14 has through compensation holes 44 of small diameter drilled through the cylinder walls and located in such a place than when striker is in the initial position, holes 44 are located directly above the upper end face of striker 34.

In the lower part of cylinder 14 below holes 44, the cylinder wall has several idle-stroke holes 46 which have diameters much greater than that of compensation holes 44.

The lower part of cylinder 14 is surrounded from outside by a hollow casing 48 which embraces holes 44 and idle-stroke holes 46. Casing 48 is sealed against the outer surface of cover 17 by seal rings 50 and against the outer surface of cylinder 14 by seal ring 52. A space 54 defined between the lower end face of striker 34, inner walls of cylinder 14, and bottom wall 20 of the cylinder, and a space 56 within hollow casing 48 form an auxiliary chamber which can communicate with main working chamber 38 via compensation holes 44 in the initial position (FIG. 1), or through holes 44 and idle-stroke holes 46 during the idle stroke.

A space 49, which is located above cover 17, is connected to the atmosphere. Pumping chamber 27 has two check valves, i.e., a suction check valve 45, which is installed in cover 17 and admits air only in the direction from space 49 to pumping chamber 27, and a pressure valve 47, which is installed in the side wall of cylinder 14 and admits air only in the direction from pumping chamber 27 to auxiliary chamber 54, 56. Both valves 45 and 47 are generally identical, and therefore only one of them, e.g., valve 45 will be now described.

Check valve 45 consists of a valve housing 53 which is threaded into cover 17, a valve element 55, valve seat 55a, and a spring 61. The valve admits air from atmosphere-pressure space 49 into pumping chamber 27, but does not let air escape from pumping chamber 27 in the opposite direction.

Hollow casing 48, cylinder 14, and tool holder 32 are held in place by means of a cover 57 which is attached to housing 12 by bolts 58.

In those cases where it is necessary to reduce the overall length of the power tool, an embodiment shown schematically in FIG. 3 can be used. In this embodiment, housing 60 also fulfills a function of the hollow casing and the cover of embodiment of FIG. 1. In other words, a sealed pumping chamber 62 of power tool 59 is formed between the upper face of piston 64, inner walls of cylinder 66, and inner walls of upper portion of housing 60.

Power tool 59 also has an auxiliary chamber 63 which is formed between cylinder 66 and housing 60. A crank mechanism 68 is located inside pumping chamber 62 and is driven, e.g., from an electric motor 70 via a reducer 72. Piston 70 and reducer 72 are located outside pumping chamber 62, and an output shaft 74 of reducer 72 passes into pumping chamber 62 through a seal ring 76 which seals shaft 74 against housing 60. The portion of housing 60 which defines pumping chamber 62 has a special configuration which embraces crank mechanism 68 with minimum gaps but without interference with movement of its elements. A suction valve 78 and pressure valve 80, which are provided in pressure chamber 62, are the same as respective valves 45 and 47 of the embodiment of FIG. 1 and fulfill the same functions. More specifically, suction valve 78 admits air only from the atmosphere into pumping chamber 62, while pressure valve 80 admits air in the direction only from pumping chamber 62 to auxiliary chamber 63. The remaining parts, i.e., the striker, working tool, compensation and idle-stroke holes, etc., are the same as in the embodiment of FIG. 1.

FIGS. 1 and 2—Operation of Percussion Power Tool of the Invention

Operation of percussion power tool 10 will now be considered starting from the initial position which is shown in FIG. 1.

When a drive motor (not shown) is switched on, it transmits the power to crank mechanism 18 via the reducer (also not shown), so that piston 16 commences its movement in cylinder 14 in the upward direction from the lower dead center. As piston 16 moves up, the volume of main working chamber 38 is increased, and therefore a vacuum is induced in this chamber. The force of vacuum causes striker 34 to slide in a cylinder 14 in upward direction. As a result, striker 34 follows piston 16 with delay. In the beginning of its stroke in the upward direction, striker 34 covers compensation holes 44, thereby sealing auxiliary chamber 54, 56 and disconnecting it from main working chamber 38. In the course of further upward motion of striker 34, the volume of auxiliary chamber 54, 56 is increased, so that a vacuum is induced in this chamber as well.

While piston 16 moves in the upward direction, air in pumping chamber 27 is compressed and is replaced into chamber 56 via pressure valve 47. At this period of the cycle, suction valve 45 is closed, as its valve element is pressed to its seat by air pressure developed in pumping chamber 27. From chamber 56 air is forced via idle-stroke holes 46 into chamber 54 below striker 34.

The vacuum of the auxiliary chamber also applies to striker 34 a force, which is opposite to that applied from vacuum in main working chamber 38, However, vacuum is developed in auxiliary chamber 54, 56 with delay with respect a vacuum in the main working chamber. Therefore, striker 34 continues to move up by inertia. Meanwhile, piston 16 reaches the upper dead center and reverses its movement, i.e., begins to move down. In other words, at this moment of the cycle, piston 16 and striker 34 moves toward each other, compressing air in main working chamber 38.

After reversing, striker 34 performs its working stroke in the downward direction. When striker 34 comes into contact with tail portion 26 of working tool 24, it transmits to the working tool an increased impact energy.

Because the quantity of air in auxiliary chamber 54, 56 has been increased by suction of air through check valve 47, pressure in auxiliary chamber will be increased as compared to the previous cycle. This pressure will be higher than that in main working chamber 38. At the moment of impact, compensation hole 44 will be uncovered by striker 34, so that auxiliary chamber 54, 56 will communicate with main working chamber 38, and pressures in both these chambers will be equalized. Now the power tool is ready for the next cycle which will be repeated in the same manner, but with an increased pressure. Such an increase in pressure will be continued from cycle to cycle until in the position of the piston in the upper dead center, the pressure in pumping chamber 27 becomes equal to or lower than the pressure in auxiliary chamber 54, 56, so that valve 47 will remain closed. As a result, in the lower dead center of piston 16, the pressure in pumping chamber 27 will become greater than the atmospheric pressure, and additional air will not be sucked in pumping chamber 27 via suction valve 45.

Such a transitional mode of operation will continue during several cycles after starting of the power tool, and after the power tool has reached established conditions, both valves 45 and 47 will not operate.

Thus, in the starting or transitional period of operation of the power tool, pumping chamber 27 works as an air pump which pumps air from the atmosphere into auxiliary chamber 54, 56, and via compensation holes 44 into main working chamber 38.

In other words, the quantity of air in the auxiliary and main chambers has been increased on the previous cycles, and therefore in the above-mentioned initial position of the power tool, the pressure in auxiliary chamber 54, 56 and main working chamber 38 will be increased as well. As a result, under the established conditions, the power tool will work with a substantially increased initial pressure. This will increase the energy of impact. Because the quantity of air in the main working chamber is increased, the peak of pressure in this chamber and thus the level of vibrations will be reduced.

When the operator raises the power tool and disconnects it from object 0, e.g., for carrying to a new working place, striker 34 and working tool 24 descend under the gravity, so that flange 25 of the tool rests on holder 32 and striker 34 rests on the tail portion of tool 24, or on bottom wall 20. In this position, the upper end face of striker 34 descends below idle stroke holes 46, and main working chamber 38 is connected to auxiliary chamber 54,56 via a passage of a large cross-section. As a result, the pressure in both chambers is maintained equal, irrespective of the movement of the piston, so that the striker remains at rest.

Provision of pumping chamber 27 makes it possible to considerably increase the initial position pressure in the main working chamber and auxiliary chambers. This increase is determined by air compression rate provided by pumping chamber 27, i.e., any required pressure can be achieved if necessary. As a result, the power tool can be produced with energy of impact increased by several times as compared to conventional power tools of the same size and weight.

Percussion power tool 59 (FIG. 3) has a pumping chamber 62 which contains crank mechanism 68 connected directly to piston 64 without the use of a piston rod, this tool operates similarly to power tool 10 of FIG. 1. Therefore operation of this power tool does not require a separate explanation.

Thus it has been shown that the percussion power tool of the invention is light in weight, has a reduced length and develops an increased impact energy.

Synopsis, Ramification, and Scope

The present invention has been illustrated in the form of specific embodiments shown in FIGS. 1 to 3. It is understood, however, that these embodiments have been given only as examples and that any other modifications are possible within the scope of the appended claims. For examples, the power tool was described as a hand-held tool. It can be, however, a tractor-mounted unit. The lower bottom of the cylinder, as well as the construction of the holder and connection of the cylinder to the housing can be modified. Compensation holes can be formed as longitudinal grooves on the inner surface of the cylinder. The drive can be obtained from a hydraulic, pneumatic motor or an internal combustion engine. The piston can even be driven by reciprocating electromagnetic drive mechanism. The principle of the invention can be incorporated into a rotary drive impact machine such as rotary hammer, perforator, etc. The check valves can be located in other places where the atmospheric-pressure air can be sucked into the auxiliary chamber. The check valve may have a different construction e.g., it can be formed as a leaf spring. Therefore the scope of the invention should be determined not by the examples given, but by appended claims and their legal equivalents.

I claim:

1. A vacuum-compressor-type percussion power tool, comprising:

housing means having inner and outer walls;

cylinder means located in said housing means and fixed therein, said cylinder means having outer and inner walls, a closed upper wall, and a closed bottom wall with inner and outer sides, said closed bottom wall having a central opening;

reciprocating drive means supported by said housing means opposite to said bottom wall;

piston means slidingly guided in said cylinder means and driven by said reciprocating drive means, said piston means having an upper end face, a lower end face, and a periphery;

a working tool with a tail portion inserted into said cylinder means through said central opening, said working tool having means which limits insertion of said working tool into said cylinder means;

floating striker means having upper and lower end faces and located in said cylinder means for sliding therein between said piston means and said tail portion of said working tool inserted into said cylinder means;

a main working chamber formed in said cylinder means between said lower end face of sad piston means and said upper end face of said striker means;

an auxiliary chamber which consists of a first space and a second space, said first space being formed between said inner walls of said housing means and said outer walls of said cylinder means, said second space being formed between said lower end face of said striker means, said inner walls of said cylinder means, and said upper end face of said bottom wall;

a first set of through holes formed in the wall of said cylinder means above said striker means, said first set of holes connecting said main working chamber with said auxiliary chamber;

a second set of through holes in said walls of said cylinder means between said first set of holes and said bottom wall, said second set of holes connecting said first space with said second space, said second set of holes having diameters substantially greater than those of said holes of said first set;

sealing means for sealing said auxiliary chamber against penetration of air from the atmosphere; and air-pumping means for pumping air under pressure into said auxiliary chamber from the atmosphere, said air-pumping means comprising:

a pumping chamber formed between said upper end face of said piston means, said closed upper wall of said cylinder means, and the walls of said cylinder means;

first one-way valve means which admits air into said pumping chamber from the atmosphere only;

second one-way valve means which admits air into said auxiliary chamber from said pumping chamber only; and sealing means for sealing said pumping chamber against the atmosphere, said auxiliary chamber, and said main working chamber.

2. The vacuum-compression type percussion power tool of claim 1 wherein said first and second one-way valve means comprise check vales.

3. The vacuum-compression type percussion power tool of claim 1 wherein said reciprocating drive means is located in said sealed pumping chamber.

4. The vacuum-compression type percussion power tool of claim 1 wherein said closed upper wall of said cylinder means is a part of said housing means.

5. The vacuum-compression type percussion power tool of claim 4 wherein said reciprocating drive means comprises a crank mechanism with a crank and a connecting rod, said connecting rod being pivotally connected to said piston means.

6. A vacuum-compression type percussion power tool comprising:

housing having outer and inner walls;

cylinder located in said housing and fixed therein, said cylinder having inner and outer side walls, a closed upper wall, and a closed bottom wall with an inner and outer sides, said closed bottom wall having a central opening;

reciprocating drive mechanism supported by said housing on the side thereof opposite to said bottom wall;

piston means slidingly guided in said cylinder and driven by said reciprocating drive mechanism, said piston means having an upper end face, a lower end face, and a periphery;

a working tool with a tail portion inserted into said cylinder through said central opening, said opening having sealing means for sealing said tail portion against penetration of air from the atmosphere to said auxiliary chamber, said working tool having means which limits insertion of said working tool into said cylinder;

a floating striker having upper and lower end faces and located in said cylinder for sliding therein between said piston means and said tail portion of said working tool inserted into said cylinder;

a main working chamber formed in said cylinder between said lower end face of said piston means and said upper end face of said striker;

an auxiliary chamber, which consists of a first space and a second space, said first space being formed between said inner walls of said housing and said outer walls of said cylinder, and said second space being formed between said lower end face of said striker, said inner walls of said cylinder, and said upper end face of said bottom wall;

a first set of through holes formed in the wall of said cylinder above said striker, said first set of holes connecting said main working chamber with said auxiliary chamber;

a second set of through holes in said walls of said cylinder between said first set of holes and said bottom wall, said second set of holes connecting said first space with said second space, said holes of said second set having diameters substantially greater than those of said holes of said first set;

first sealing means for sealing said auxiliary chamber against penetration of air from the atmosphere;

second sealing means in said opening of said bottom wall for sealing said a sealed air-pumping chamber formed between said upper end face of said piston means, said closed upper wall of said cylinder, and side walls of said cylinder;

a first check valve in the upper wall of said pumping chamber which admits air only from the atmosphere into said pumping chamber;

a second check valve in the side wall of said pumping chamber which admits air only from said pumping chamber into said auxiliary chamber;

and sealing means for sealing said pumping chamber against the atmosphere, said auxiliary chamber and said main working chamber.

7. The vacuum-compression type percussion power tool of claim 6 wherein said reciprocating drive mechanism is located in said sealed pumping chamber.

8. The vacuum-compression type percussion power tool of claim 7 wherein said reciprocating drive mechanism comprises a crank mechanism with a crank and a connecting rod, said connecting rod being pivotally connected to said piston means.

9. The vacuum-compression type percussion power tool of claim 6 wherein said closed upper wall of said cylinder is a part of said housing.

10. The vacuum-compression type percussion power tool of claim 6 wherein said piston means comprises a piston and a piston rod connected to said piston on its upper end face side, said closed upper wall of said cylinder means having a central hole, said piston rod being slidingly fit in said central hole and passing therethrough.

11. The vacuum-compression type percussion power tool of claim 6 wherein in an initial position of said power tool, which is obtained when said working tool rests on an object, said means which restricts insertion of said working tool is urged to said outer side of said bottom wall, said piston means is in its lower dead center, and said upper end face of said striker is located below said first set of holes.

12. The vacuum-compression type percussion power tool of claim 11, wherein in said initial position, said upper end face of said striker is located directly below said first set of holes, said holes of said second set being arranged in series in the axial direction of said cylinder from said first set of holes to said bottom wall.

13. The vacuum-compression type percussion power tool of claim 11, wherein in said initial position, said upper end face of said striker partially overlaps said first set of holes.

* * * * *